United States Patent
He et al.

(10) Patent No.: US 7,986,144 B2
(45) Date of Patent: Jul. 26, 2011

(54) SENSOR AND INSULATION LAYER STRUCTURE FOR WELL LOGGING INSTRUMENTS

(75) Inventors: Qingyan He, Pearland, TX (US); Richard Dan Ward, La Porte, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 324 days.

(21) Appl. No.: 11/828,431

(22) Filed: Jul. 26, 2007

(65) Prior Publication Data
US 2009/0025924 A1 Jan. 29, 2009

(51) Int. Cl.
*G01V 3/18* (2006.01)
(52) U.S. Cl. .......................... 324/324; 324/369; 324/338
(58) Field of Classification Search .................. 324/345, 324/347–359, 366–373, 338–343, 346, 324; 166/249–250.17; 181/105
See application file for complete search history.

(56) References Cited

U.S. PATENT DOCUMENTS

| | | | |
|---|---|---|---|
| 3,772,589 A | 11/1973 | Scholberg | |
| 4,286,217 A | 8/1981 | Planche et al. | |
| RE32,564 E | 12/1987 | Scholberg | |
| 4,738,812 A | 4/1988 | Raynal | |
| 5,661,402 A | 8/1997 | Chesnutt et al. | |
| 5,680,049 A | 10/1997 | Gissler et al. | |
| 5,869,968 A * | 2/1999 | Brooks et al. | 324/338 |
| 6,015,607 A | 1/2000 | Fraivillig | |
| 6,577,244 B1 | 6/2003 | Clark et al. | |
| 6,646,441 B2 | 11/2003 | Thompson et al. | |
| 6,933,726 B2 * | 8/2005 | Chen et al. | 324/339 |
| 7,000,697 B2 | 2/2006 | Goode et al. | |
| 7,224,872 B2 | 5/2007 | Goldner et al. | |
| 7,263,029 B2 * | 8/2007 | Jackson et al. | 367/25 |
| 2005/0030038 A1 | 2/2005 | Chen et al. | |
| 2006/0070734 A1 | 4/2006 | Zillinger et al. | |
| 2007/0107896 A1 | 5/2007 | Finci et al. | |
| 2007/0131412 A1 | 6/2007 | Finci et al. | |

* cited by examiner

*Primary Examiner* — Reena Aurora
(74) *Attorney, Agent, or Firm* — Shaun Sethna; Darla Fonseca; Kevin McEnaney

(57) ABSTRACT

A logging sonde includes a tube defining a sealed chamber inside. An isolation layer is disposed on an exterior of the tube. At least one sensor is disposed on an exterior of the isolation layer. The sensor includes a lead in passing through a wall of the tube. An elastomer jacket is disposed on an exterior of the sensor and the isolation layer. A method for making a sonde includes affixing an electrically insulating isolator to an exterior of a tube. An hydraulic seal layer is affixed over an exterior of the isolator. A sensor is affixed over the exterior of the seal layer. An electrical connection is made from the sensor to an interior of the tube through the hydraulic seal layer and through the isolator. An elastomer jacket is applied over the exterior of at least part of the sensor and the exterior of the seal layer.

20 Claims, 2 Drawing Sheets

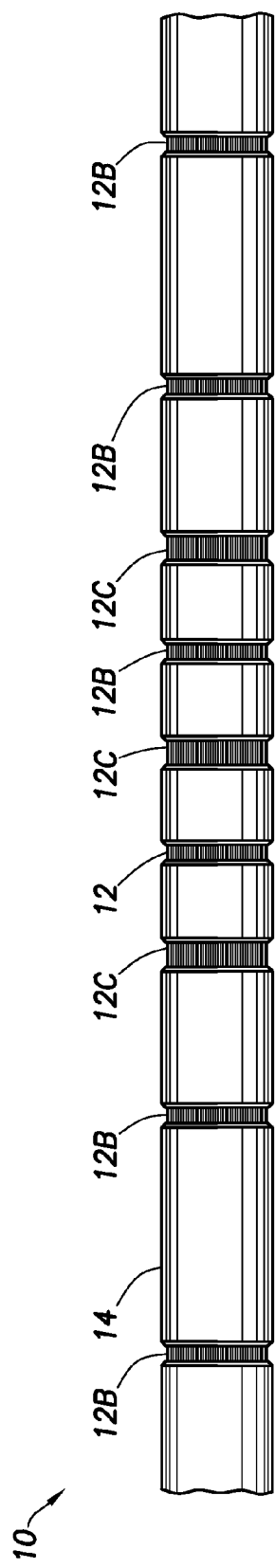
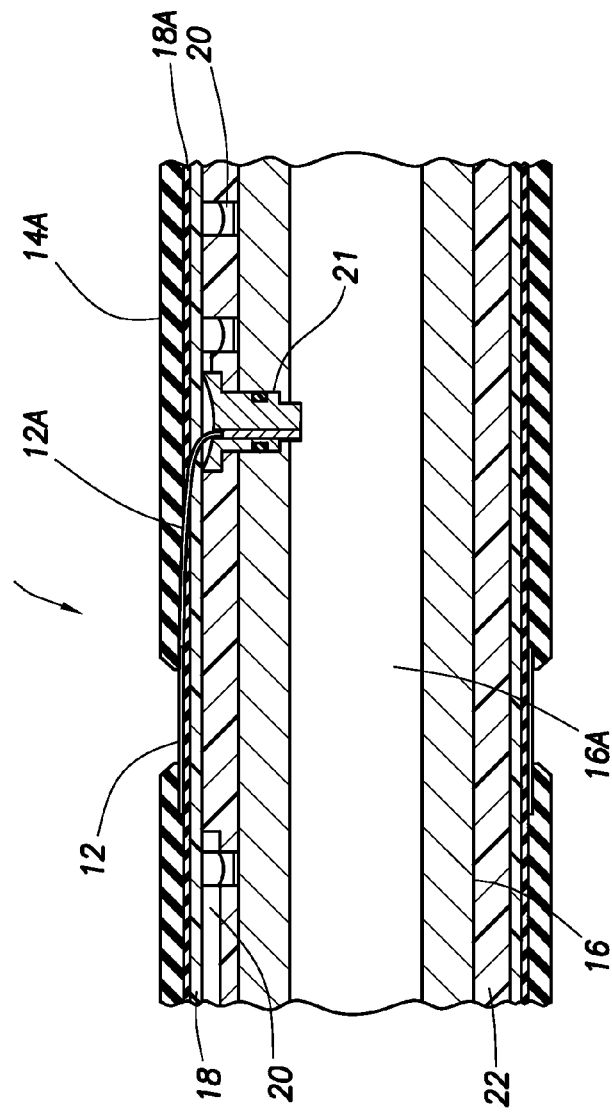

SENSOR AND INSULATION LAYER STRUCTURE FOR WELL LOGGING INSTRUMENTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of well logging instruments. More specifically, the invention relates to structures for attaching sensors to a sonde mandrel and for insulating such sensors on well logging instruments and sealing the interior of the instrument from fluid entry.

2. Background Art

Certain types of well logging instruments include sensors, such as galvanic electrodes, mounted on an exterior of a housing or "sonde" configured to be moved through a wellbore drilled through subsurface formations. Galvanic well logging instruments are used to make measurements of electrical properties of the formations surrounding the wellbore. Such properties include electrical resistivity of the formations and a measure of spontaneous electrical potential existing in the wellbore that is related to the contrast between the resistivity of the liquid phase of fluid ("mud") filling the wellbore and the resistivity of the connate water disposed in the pore spaces of porous formations. Typical galvanic well logging instruments are described, for example in U.S. Pat. No. 3,772,589 issued to Scholberg, U.S. Pat. No. 4,286,217 issued to Planche et al., and U.S. Reissue Pat. No. RE32,564 issued to Scholberg, all of which are assigned to the assignee of the present invention.

Well logging instruments with externally mounted sensors, such as the foregoing galvanic well logging instruments, typically include a sonde mandrel with one or more electrodes disposed on the exterior surface of the sonde mandrel. The one or more electrodes are electrically insulated from the body of the sonde mandrel, and in instruments that have a plurality of such electrodes, the electrodes are electrically insulated from each other as well as from the sonde mandrel. Such insulation constrains electric current to flow in paths defined by the position of the electrodes on the mandrel and by any measuring and/or focusing currents applied to the electrodes.

One example of galvanic electrode or external sensor mounting known in the art is shown in oblique view in FIG. 1A. An electrode 12 or other sensor is disposed within a recess or reduced diameter portion of an outer composite jacket 14 of a sonde mandrel 10. The jacket 14 is electrically non-conductive and isolates the electrode 12 from conductive portions of the sonde mandrel 10 and from other, similar electrodes disposed at other longitudinal positions along the sonde mandrel. FIG. 1B shows a cut away view of the portion of the sonde mandrel 10 shown in FIG. 1A to illustrate the internal structure thereof. The sonde mandrel 10 includes a steel or similar high strength metal tube or mandrel 16 in the longitudinal center to provide structural integrity to the sonde mandrel 10 and to provide a pressure-sealed interior chamber 16A in which may be disposed various signal processing and telemetry circuits (not shown) known in the art. The mandrel or tube is surrounded on its exterior surface by an electrical isolation layer 22 formed from composite such as glass fiber reinforced epoxy resin. The isolation layer 22 provides electrical insulation from the tube 16 for the various electrodes disposed on the on the sonde mandrel 10. The isolation layer 22 may include one or more recesses, pockets or similar features, shown generally at 20, in its exterior surface for enclosing sensors, such as wire coil electromagnet induction transducers or other electronic devices. The isolation layer 22 is surrounded on its exterior surface by a stabilization layer 18, that serves to enclose the pockets 20. The electrode 12 may be a metal foil bonded to a flexible substrate, such as polymer film. See, for example, U.S. Pat. No. 6,015,607 issued to Fraivillig. The electrode 12 may also be plain metal foil, such as 316 alloy stainless steel or monel. A lead wore 12A from the electrode 12 may make electrical contact to circuits (not shown) in the interior 16A of the tube 16 through the wall of the tube 16 using a pressure-sealed feedthrough connector 21 such as one sold by Kemlon Products and Development, Pearland, Tex. The feedthrough 21 provides an insulated electrical path for the lead wire 12A while excluding fluid under pressure from entering the interior of the tube 16. A hydraulic seal layer 18A of rubber, such as nitrile rubber, is molded over the exterior of the stabilization layer 18 to exclude fluid entry to the stabilization layer 18. Mechanical integrity is provided to the seal layer 18A and to the electrode 12 by molding, adhesively bonding or otherwise coupling the jacket 14 over the hydraulic seal layer 18A.

It has been observed that a frequent failure mechanism is fluid leakage past the point of penetration of the hydraulic seal layer 18A by the lead in wire 12A from the electrode. Such leakage can cause short circuits between electrodes, or may damage sensors or other devices disposed on one or more of the pockets 20.

SUMMARY OF THE INVENTION

A wellbore logging sonde according to one aspect of the invention includes a tube defining a pressure-sealed chamber in an interior thereof. An isolation layer is disposed on an exterior surface of the tube. At least one sensor is disposed on an exterior surface of the isolation layer. The at least one sensor includes a lead in passing through a wall of the tube. An elastomer jacket is disposed on an exterior of at least part of the sensor and the isolation layer.

A method for making a well logging sonde includes affixing an electrically insulating isolator to an exterior of a sonde tube. An hydraulic seal layer is affixed over an exterior of the isolator. At least one sensor is affixed over the exterior of the hydraulic seal layer. An electrical connection is made from the at least one sensor to an interior of the sonde tube through the hydraulic seal layer and through the isolator. An elastomer jacket is applied over the exterior of at least part of the at least one sensor and the exterior of the hydraulic seal layer.

Other aspects and advantages of the invention will be apparent from the following description and the appended claims.

BRIEF DESCRIPTION OF THE DRAWINGS

FIG. 2 shows one example of an arrangement of sensors such as galvanic electrodes on an sonde.

FIG. 3 shows a cut away view of part of the sonde mandrel shown in FIG. 2.

DETAILED DESCRIPTION

Figure 1A:
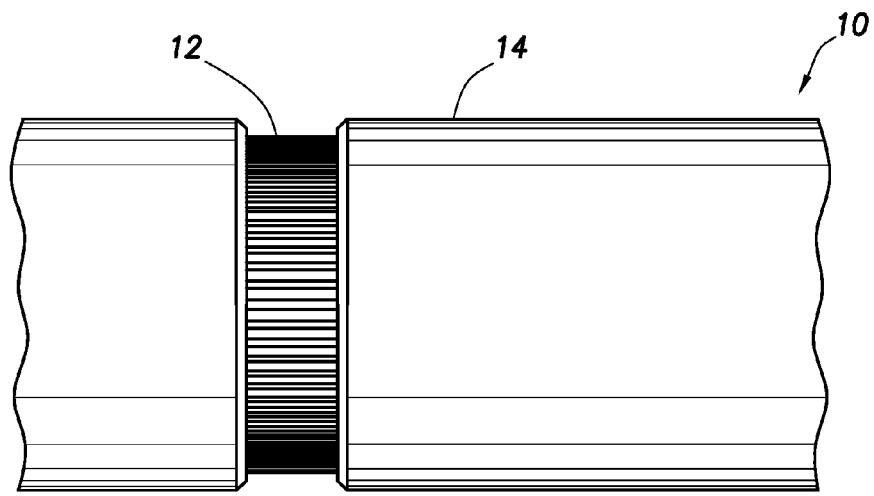
FIG. 1A shows an external view of a prior are configuration of electrode mounting and insulation on a sonde mandrel of a galvanic well logging instrument.
Figure 1B:
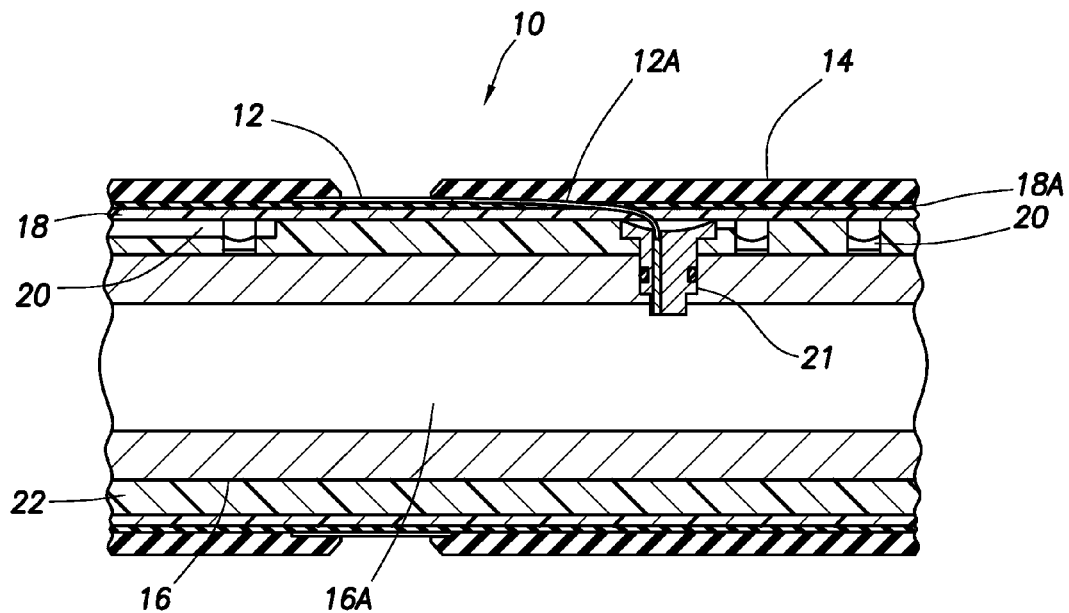
FIG. 1B shows a cut away view of the sonde mandrel shown in FIG. 1A.

FIG. 2 shows one example of a well logging sonde including a plurality of sensors disposed along the exterior of the sonde mandrel 10. The sensors in the example shown in FIG. 2 may be galvanic electrodes such as current source electrodes 12C and measuring electrodes 12B, each electrically coupled to respective portions of circuitry (not shown) disposed inside the sonde mandrel 10 or elsewhere in a well logging instrument. The arrangement of sensors shown in FIG. 2 is only meant to provide an example of possible configurations of sensors on a sonde according to the invention.

FIG. 3 shows a cut away view of one portion of the sonde shown in FIG. 2 to illustrate one example of a sensor mounting structure according to the invention. A sensor 12 such as a galvanic electrode may be disposed within a recess, opening or similar reduced diameter portion underneath an outer rubber jacket 14A disposed on an exterior of a sonde mandrel 10. The jacket 14 seals against fluid entry below a hydraulic layer 18A, as will be further explained below, and electrically isolates the electrode 12 from other, similar sensors or electrodes disposed at other longitudinal positions along the sonde mandrel 10 (such as shown in FIG. 2, for example). While the sensor 12 shown in FIG. 3 is an electrode, it should be understood that the invention is applicable to any sensor that is mounted on the exterior of the sonde mandrel 10 and includes a signal and/or power lead ("lead in") that passes through the wall of the sonde mandrel 10. Non-limiting examples of such externally mounted sensors include capacitance sensors and temperature sensors.

The sonde mandrel 10 can include a monel, stainless steel, beryllium copper or similar high strength, high electrical conductivity, preferably non-magnetic metal tube 16 in the lateral center of the sonde mandrel 10 to provide structural integrity to the sonde mandrel 10 so that it can transmit substantial axial tension therethrough, and so that it can provide a pressure-sealed interior chamber 16A in which may be disposed various signal processing and telemetry circuits (not shown) known in the art, as well providing a passage for electrical and/or optical conductors through the sonde mandrel 10. The tube 16 is surrounded on its exterior surface by an electrical isolation layer 22, which may be formed from a composite material such as glass fiber reinforced epoxy resin. The isolation layer 22 provides electrical insulation from the tube 16 for the various sensors (electrodes—see 12B, 12C in FIG. 2) disposed on the exterior of the sonde mandrel 10. The isolation layer 22 may include one or more recesses, pockets or similar features, shown generally at 20, in its exterior surface for enclosing sensors, for example, wire coil electromagnetic induction transducers (not shown separately) or other electronic devices. The isolation layer 22 is preferably surrounded on its exterior surface by a stabilization layer 18, that serves to externally enclose the pockets 20. The stabilization layer 18 may also be made from composite material such as glass fiber reinforces epoxy resin. A hydraulic seal layer 18A, which can be made from elastomer, for example, rubber such as nitrile rubber, can be molded over the exterior of the stabilization layer 18 to exclude fluid entry through the stabilization layer 18 into the interior chamber 16A of the tube 16.

The electrode 12 may be a metal foil bonded to a flexible substrate, such as polymer film. See, for example, (U.S. Pat. No. 6,015,607 issued to Fraivillig. The electrode 12 may also be plain (unbonded) metal foil, such as 316 alloy stainless steel or monel, or may be metal foil bonded to an elastomer substrate. Typical thicknesses of such unbonded foil may be in the range of 0.010 to 0.020 inches, although the foil thickness is not a limit on the scope of the invention. A lead wire ("lead in") 12A coupled to the electrode 12 may be used to make electrical contact to circuits or through wires (not shown) disposed in the interior 16A of the tube 16, where such connection is made through the wall of the tube 16. Such through-wall connection may be made using a pressure-sealed feedthrough connector. The feedthrough connector 21 provides an externally insulated electrical path for the lead in 12A and also excludes fluid under pressure from entering the interior chamber 16A of the tube 16 where the lead in 12A passes through the wall of the tube 16. The electrode 12 may be adhesively bonded or otherwise affixed to the exterior of the hydraulic seal layer 18A. The lead in 12A penetrates the hydraulic layer 18A proximate the feedthrough connector 21 to make contact with the electrical contact part of the feedthrough connector 21. The electrode 12 is generally disposed over the hydraulic layer 18A, and requires that the lead in 12A penetrates the hydraulic layer 18A to electrically connect to the feedthrough connector 21. It will be apparent to those skilled in the art that the lead in 12A can also be an optical fiber connection in other examples. Accordingly, the invention is not limited in scope to use with electrical lead ins or electrical feedthrough connectors.

To exclude fluid from moving through the hydraulic layer 18A, and to provide external electrical isolation and mechanical integrity to the electrode 12 and to the hydraulic seal layer 18A, a jacket 14 may be molded over the exterior of the electrode 12 and the hydraulic 18A.

In one example, the entire exterior of the sonde mandrel 10 may be overmolded by the jacket 14, and portions of the electrode 12 that are to be exposed to the wellbore may be so exposed by cutting or machining the portion of the jacket 14 covering such electrode portions. In other examples, the jacket 14 may be molded in segments, leaving exposed those portions of the electrode intended to be exposed to the wellbore.

The jacket 14 in some examples may be made from an elastomer, such as nitrile rubber, having resistance to chemical degradation caused by fluids in the wellbore. Such jacket may be made from elastomer that is resistant to diffusion of gas in the wellbore, such that decompression of the jacket when the sonde mandrel is withdrawn from the wellbore will not result in exfoliation or other breakdown of the jacket 14. In some examples, the elastomer used to make the jacket 14 may have a durometer value of 80 to 90 Shore A to resist abrasive damage with the sonde mandrel 10 is moved through the wellbore.

A sonde mandrel made according to various aspects of the invention may have reduced failure due to fluid penetration of external sealing devices, reduced failure due to electrical leakage between sensors on the exterior of the sonde mandrel, and lower maintenance and repair costs than similar sonde mandrels made using techniques and structures known in the art prior to the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A wellbore logging sonde, comprising:
   a tube defining a pressure-sealed chamber in an interior thereof;
   an isolation layer disposed on an exterior surface of the tube;
   at least one sensor disposed on an exterior surface of the isolation layer, the at least one sensor including a lead in passing through a wall of the tube;
   an elastomer jacket disposed on an exterior of at least part of the sensor and the isolation layer; and
   an elastomeric hydraulic seal layer disposed between the exterior of the isolation layer and an interior of the jacket,
   wherein the jacket comprises rubber having Shore A hardness in a range of about 80 to 90, and
   wherein the jacket is formed by molding over an exterior of the entire sonde, and a portion of the molded jacket is removed to expose the at least one sensor.

2. The sonde of claim 1 wherein the at least one sensor comprises a metal foil electrode.

3. The sonde of claim 1 wherein the at least one sensor comprises a metal foil electrode bonded to a flexible substrate.

4. The sonde of claim 1 wherein the tube is formed from non-magnetic metal alloy.

5. The sonde of claim 1 wherein the lead in is coupled to a pressure sealed feedthrough bulkhead passing through the wall of the tube.

6. The sonde of claim 1 wherein the jacket comprises nitrile rubber.

7. A method for making a well logging sonde, comprising:
   affixing an electrically insulating isolator to an exterior of a sonde tube;
   affixing an hydraulic seal layer over an exterior of the isolator;
   affixing at least one sensor over the exterior of the hydraulic seal layer;
   making a lead in connection from the at least one sensor to an interior of the sonde tube through the hydraulic seal layer and through the isolator; and
   applying an elastomer jacket over the exterior of at least part of the at least one sensor and the exterior of the hydraulic seal layer, wherein the applying the elastomer jacket comprises overmolding substantially an entire exterior surface of the at least one sensor, and exposing part of the at least one sensor by machining the overmolded jacket.

8. The method of claim 7 wherein the isolator comprises fiber reinforced plastic.

9. The method of claim 7 wherein the making a lead in connection comprises coupling an electrical lead wire from the at least one sensor to a pressure sealed feedthrough bulkhead passing through a wall of the sonde tube.

10. The method of claim 7 wherein the jacket comprises nitrile rubber.

11. The method of claim 7 wherein the jacket comprises rubber having Shore A hardness in a range of about 80 to 90.

12. The method of claim 7 wherein the sensor comprises a metal foil electrode.

13. A wellbore logging sonde, comprising:
   a tube defining a pressure-sealed chamber in an interior thereof;
   an isolation layer disposed on an exterior surface of the tube;
   at least one sensor disposed on an exterior surface of the isolation layer, the at least one sensor including a lead in passing through a wall of the tube;
   an elastomer jacket disposed on an exterior of at least part of the sensor and the isolation layer; and
   an elastomeric hydraulic seal layer disposed between the exterior of the isolation layer and an interior of the jacket,
   wherein the jacket is formed by molding over an exterior of the entire sonde, and a portion of the molded jacket is removed to expose the at least one sensor.

14. The sonde of claim 13, wherein molding over the exterior of the entire sonde comprises applying the elastomer jacket over the exterior of at least part of the at least one sensor and an exterior of the hydraulic seal layer.

15. The sonde of claim 14, wherein applying the elastomer jacket comprises overmolding substantially an entire exterior surface of the at least one sensor, and exposing part of the at least one sensor by machining the overmolded jacket.

16. The sonde of claim 14, wherein the jacket comprises rubber having Shore A hardness in a range of about 80 to 90.

17. The sonde of claim 13, wherein the jacket comprises nitrile rubber.

18. The sonde of claim 13, wherein the at least one sensor comprises a metal foil electrode bonded to a flexible substrate.

19. The sonde of claim 13, wherein the tube is formed from non-magnetic metal alloy.

20. The sonde of claim 13, wherein the lead in is coupled to a pressure sealed feedthrough bulkhead passing through the wall of the tube.

* * * * *